Figure 1:
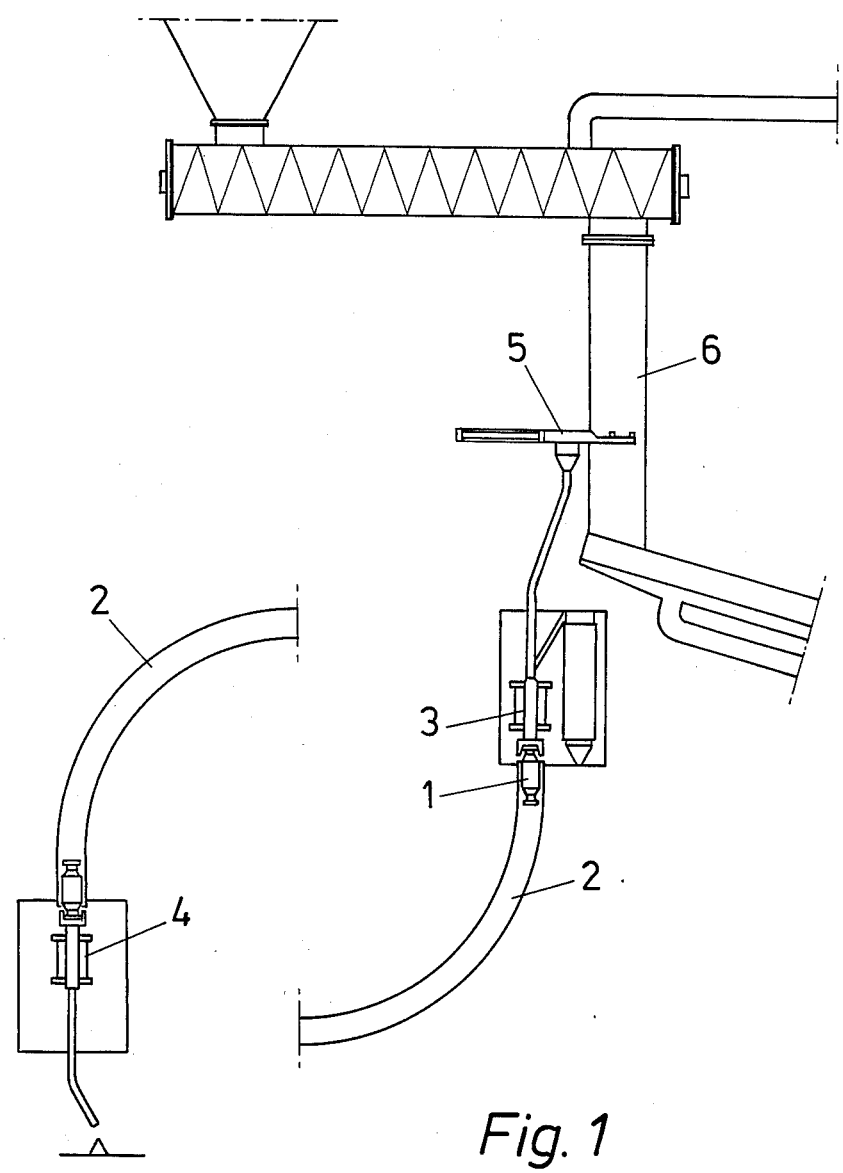

United States Patent [19]

Nordenswan

[11] Patent Number: 4,620,577

[45] Date of Patent: Nov. 4, 1986

[54] ENCLOSED MATERIAL SHUTTLE SYSTEM

[75] Inventor: Erik T. Nordenswan, Pargas, Finland

[73] Assignee: Oy Partek AB, Finland

[21] Appl. No.: 606,437

[22] PCT Filed: Aug. 25, 1982

[86] PCT No.: PCT/FI82/00032

§ 371 Date: Apr. 25, 1984

§ 102(e) Date: Apr. 25, 1984

[87] PCT Pub. No.: WO84/00945

PCT Pub. Date: Mar. 15, 1984

[51] Int. Cl.$^4$ .......................... B65B 1/04; B65B 3/04
[52] U.S. Cl. ...................... 141/98; 141/327; 141/350; 141/392; 406/111; 406/188
[58] Field of Search .......................... 141/98, 231–233, 141/325, 326, 327, 1–12, 18, 20, 348–366, 383–386, 319–322, 250–284, 392; 406/187, 188, 111

[56] References Cited

U.S. PATENT DOCUMENTS

| 1,161,089 | 11/1915 | Waldo | 220/344 |
| 1,214,389 | 1/1917 | Toth | 220/344 |
| 1,818,608 | 8/1931 | Chafkin | 220/344 |
| 4,240,769 | 12/1980 | Díaz | 406/187 |
| 4,316,682 | 2/1982 | Evans | 406/187 |

FOREIGN PATENT DOCUMENTS

| 2930472 | 7/1979 | Fed. Rep. of Germany . | |
| 0061082 | 5/1977 | Japan | 406/187 |
| 0061528 | 9/1980 | Japan | 406/187 |
| 0844512 | 8/1981 | U.S.S.R. | 406/188 |

*Primary Examiner*—Houston S. Bell, Jr.
*Attorney, Agent, or Firm*—Biebel, French & Nauman

[57] ABSTRACT

A fluid substance is transferred in a shuttle (1) by means of a pressure difference in a tube, between a filling station and an emptying station, the end of the shuttle having an opening (8) covered by a closing member (9) which can be opened resiliently (11) towards the inside of the shuttle (1). The device for filling and/or emptying the shuttle has members for holding the shuttle (1) in place while it is being filled or emptied, and members for opening the closing member (9) and for filling and emptying the shuttle (1), the mutual position of the members for holding the shuttle (1) and the member for opening the closing member (9) at the filling and the emptying station being such or capable of being made such that the end of the opening member pushes through the opening (8) of the shuttle (1) into the shuttle to a distance beyond the closing member (9).

14 Claims, 7 Drawing Figures

ENCLOSED MATERIAL SHUTTLE SYSTEM

The present invention relates to a shuttle for the transfer of a fluid substance, such as a liquid, granular or pulverous sample, by means of a pressure difference in a tube, between a filling station and an emptying station, the shuttle having at its end an opening which is covered by a closing member which can be opened. In addition, this invention relates to a device intended for the filling and/or emptying of such a shuttle, the device having members for holding the shuttle in place while it is being filled or emptied, and members for opening the closing members and for filling or emptying the shuttle.

There are previously known shuttles used for the transfer of fluid substances, the shuttles having at one end an opening which is provided with a thread and can be closed manually by means of a stopper, also threaded. Previously known is also a shuttle which can be filled and emptied automatically and has at one end an opening which can be closed with a plug which is pressed in. Such a plug can be pulled out, and pushed in mechanically in order to close the shuttle. The filling and the emptying of this shuttle are also fully automated. However, the filling and the emptying require very complicated apparatus at both the filling station and the emptying station. Pulling out the plug and pushing it in, and turning the shuttle upside down in order to empty it are motions which can be automated, but require expensive robots.

Thus there is very great need for a shuttle for transferring, by means of a pressure difference, a fluid substance in a tube between a filling station and an emptying station, and a device by means of which this shuttle can be filled and emptied more simply than previously, using structurally less expensive systems.

The main characteristics of the shuttle according to the invention and the device for filling it are given in accompanying claims 1 and 7.

According to the present invention, the structure of the filling and the emptying devices can be made very simple by fitting in each opening of the shuttle a closing member which opens resiliently towards the inside of the shuttle, in which case the mutual position of the shuttle-holding members and the member opening the closing member at the filling or emptying station is such or can be made such that the end of the opening member pushes through the shuttle opening to a distance beyond the closing member, in order to open the closing member, so that the contents of the shuttle can be emptied or the shuttle can be filled. Since there is an opening at each end of the shuttle, the transfer tube between the filling station and the emptying station can be completely closed.

According to the invention, there is thus an opening at each opposite end of the shuttle, the openings being provided with the above-mentioned closing members which open resiliently towards the inside of the shuttle. The closing member can be a ball or the like moving in the longitudinal direction of the shuttle against the action of a spring member. Also, since there is an opening with a closing member at each end of the shuttle, the shuttle need not be turned between the filling station and the emptying station, a fact which considerably simplifies the automatic system for filling and emptying.

The shuttle-filling device has preferably a substantially downwards oriented filling tube which fits snugly in the opening of the shuttle and either extends so far that, when the shuttle arrives at the filling station, it pushes through the shuttle opening into the shuttle or, when the shuttle has been fixed at the filling station, pushes through the shuttle opening into the shuttle in order to fill the shuttle with a fluid. In the former case the closing member of the shuttle opening is opened by the kinetic energy of the shuttle when the shuttle arrives at the filling station, a fact which further simplifies the structure of the filling device.

At the opposite end of the pneumatic tube there is an emptying station, at which the opening of the closing member of the opposite end of the shuttle has been arranged by means of a spindle which pushes from below through the shuttle opening into the shuttle, the thickness of the spindle being substantially smaller than the diameter of the opening, so that the fluid substance can, after the closing member has been opened, flow freely through the annular opening formed by the spindle and the opening into an outlet pipe below, inside which the spindle is fitted axially.

The holder members in the filling and the emptying devices are preferably identical and may consist of two or several two-arm levers turning to substantially opposite sides of the opening members for the shuttle-closing member, about a shaft substantially transverse to the opening member, their first lever arm being shaped as a hook oriented towards the opening member, the second lever arm being in operational contact with a slide ring member, which pushes resiliently along the opening member and towards the second lever arm, in order to force the first lever arms to turn resiliently towards each other. In order to stop the shuttle which arrives at a speed at the filling or emptying station, there is between the first, hook-like lever arms and the opening members a resiliently compressible ring-like gasketing stop.

By means of the present invention there has been created a simpler and operationally more reliable filling and emptying device for a shuttle, and with the exception of the filling tubes and the emptying spindle, more or less similar parts can be used for both devices. In addition, both ends of the shuttle can be made from similar parts, a fact which considerably simplifies the manufacture of the shuttle.

Figure 2A:
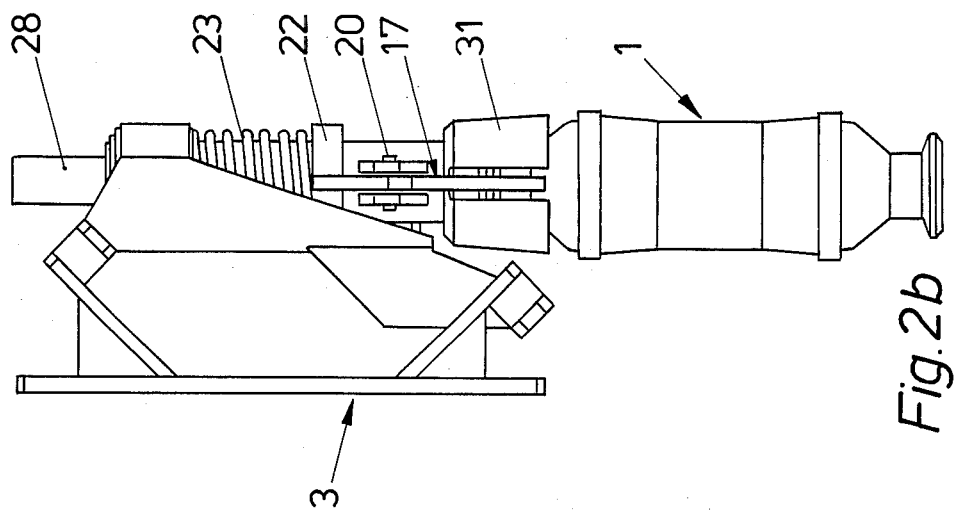
Figure 2B:
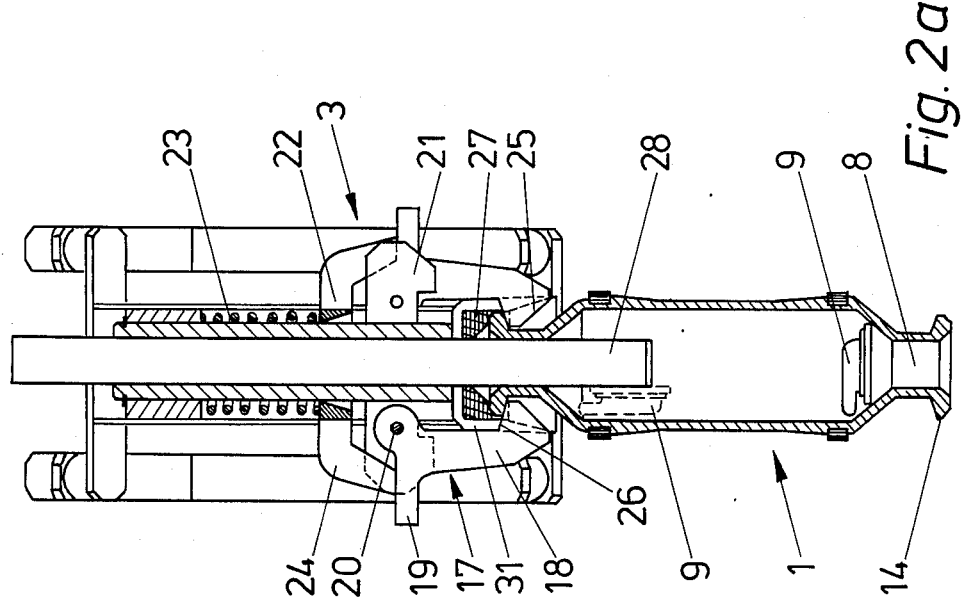
Figures 3A, 3B:
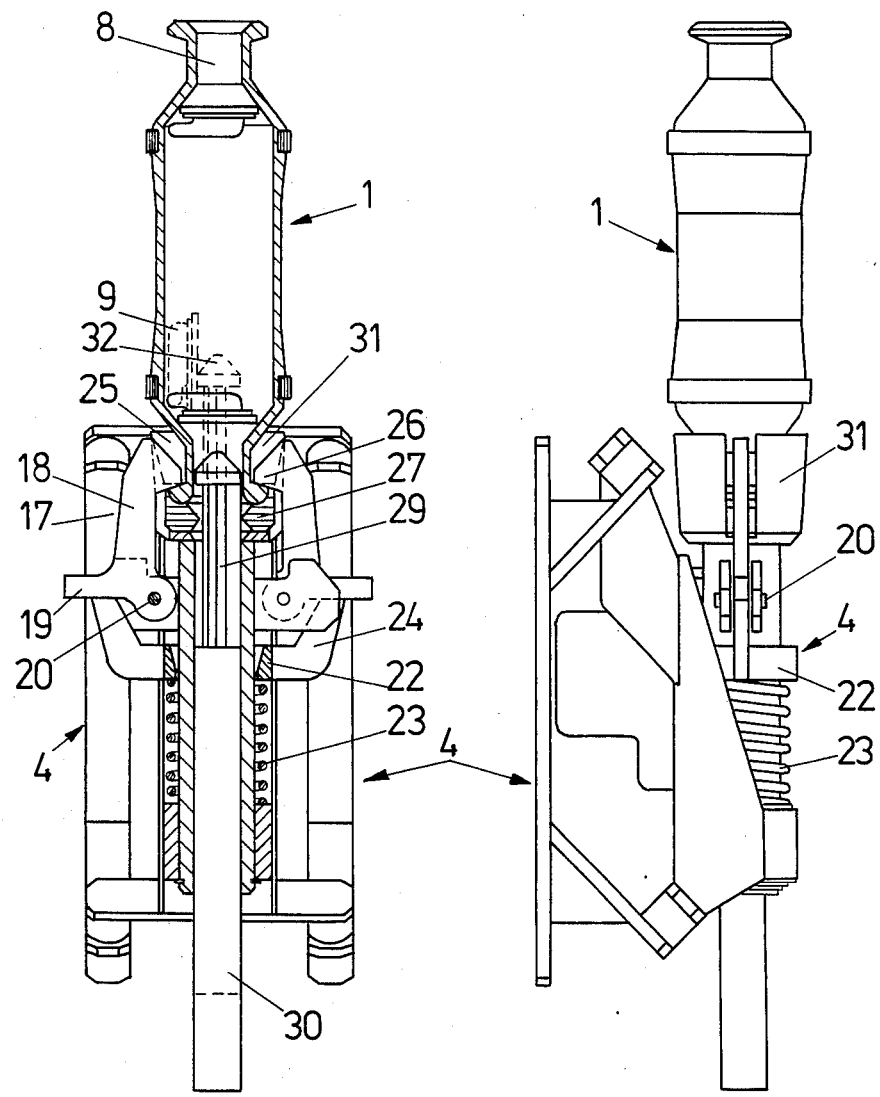
Figures 4A, 4B:
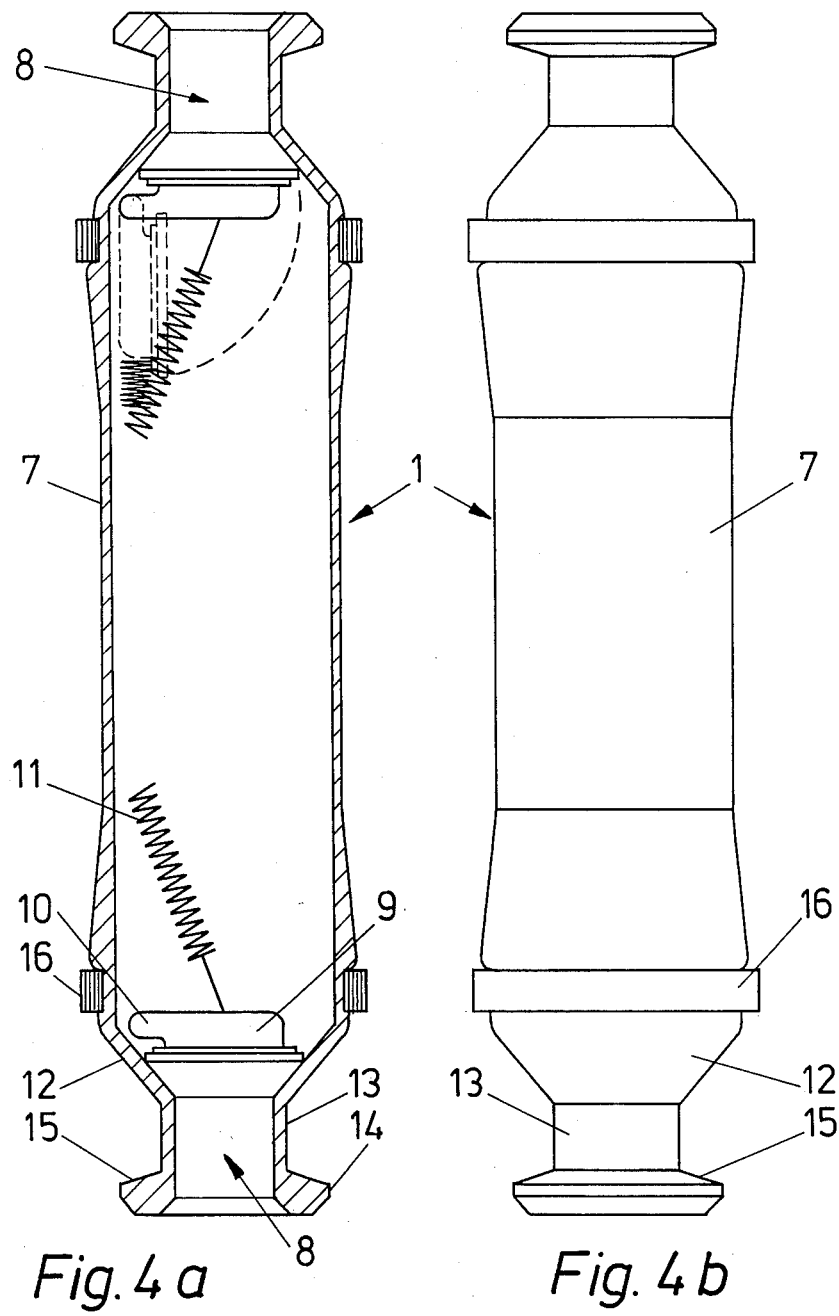

The invention is described below in greater detail with reference to the accompanying drawings, in which FIG. 1 depicts a cross sectional overall representation of a pneumatic-tube system according to the invention, connected to a process, FIG. 2a depicts a cross section of one embodiment of the filling device according to the invention during the filling stage and FIG. 2b depicts a side view of the same filling device, FIG. 3a depicts a cross section of one emptying device according to the invention at the opening stage and the emptying stage (dotted line) of the shuttle-closing member and FIG. 3b depicts a side view of the same device, FIG. 4a depicts a cross sectional vertical representation of one shuttle according to the invention and FIG. 4b depicts a side view of the same shuttle.

In FIG. 1, the shuttle is indicated by numeral 1, and it moves in tube 2 between the filling station 3 and the emptying station 4 by means of a pressure difference produced in the tube 2 in a manner known as such. The sample to be transferred is taken from the process flow 6 by means of a sample-taking device 5, which may be of the type described in Finnish Pat. No. 66,131. The sample taken by means of the sample-taking device 5 is thereafter directed to the filling station 3, at which the sample is fed into the shuttle 1 after the shuttle has arrived at the filling station 3. When the shuttle 1 is full, it detaches from the filling station 3 and moves along the tube 2 to the emptying station 4, at which the sample is removed from the shuttle 1 through the opening in its opposite end.

The pneumatic-tube system according to the present invention is used advantageously when the distance between the sample-taking place and the analysis place is relatively long, for example 200 meters–2 kilometers, or the transfer route is complicated or branches out to many points. The system according to the invention is suitable for small mass flows, for example 10–100 kg/hour. The transport system according to the invention can be used for the transfer of a fluid substance, such as a liquid, granular or pulverous sample, for example for the transfer of a raw powder sample or cement sample in a cement factory, and especially advantageously it can be used for the automatic transfer of explosive substances, far from people and in such small batches that a possible explosion will not cause great damage.

The shuttle shown in FIGS. 4a and 4b comprises a sleeve-like mantle 7 having at its opposite ends a conically converging section 12, its central opening 8 continuing as a tubular part 13 coaxially with the shuttle 1, the opening of the section 13 being encircled by a protruding collar 14, in which at least that surface which faces the shuttle 1 is beveled.

Each opening 8 of the shuttle 1 is closed on the inside by means of a flap 9 pressing against the inner surface of the conical part 12, the flap being turnable, against the action of a spring 11 fitted between the flap 9 and the mantle 1, to move away from the opening about a shaft 10 attached to the inner wall of the mantle 7 on one side of the flap and being substantially transverse to the longitudinal axis of the shuttle 1. In FIG. 4a, the open position of one flap is shown by dotted lines, and it shows that the flap opens advantageously about 90°. On the circumference of the shuttle 1 there are, furthermore, conventional encircling gasketing rings 16, which press against the inner wall of the tube 2 in order to guide the shuttle 1 and to maintain a sufficient pressure between its two ends.

As can be seen in greater detail in FIG. 2a, the shuttle 1 is filled by means of a filling tube 28 at the filling station 3, the tube 28 being oriented downwards and fitting snugly in the shuttle 1 opening, and extending so far beyond the holding members 17 and 22–24 fitted aroud it that the closing flap 9 fitted at the upper end of the shuttle is opened completely.

The shuttle 1 is held in place during the filling by means of two-arm levers 17 which grip the collar 14 encircling the shuttle opening 8, the levers 17 having been fitted to turn to the opposite sides of the filling tube 28 and about a shaft 20 transverse to its longitudinal direction. The first and downward-oriented arm 18 of the two-arm lever 17 has a hook-like lower end and is fitted to snap over the collar 14 encircling the shuttle 1 opening in order to press the opening tightly against the resiliently compressible gasket 27, situated between the levers 17 and the filling tube 28 at the bottom of the cup-like stop 31 annularly encircling the filling tube 28. That surface 25 of the hook-like end of the first arm 18 of the lever 17 which faces the shuttle 1 is beveled in such a way that the collar 14 at the upper end of the shuttle 1 arriving at speed at the filling station forces the arms 18 away from each other in such a way that the collar 14 at the upper end of the shuttle 1 impinges against the resiliently compressible gasket 27 in the cup-like stop 31, whereby the hook-like ends of the first arms 18 of the levers 17 are snapped over the collar 14 in such a way that their surface 26, also beveled, facing the gasket 27 holds the shuttle 1 in place and presses its opening tightly against the gasket 27.

The downwards oriented, hook-like arms 18 of the levers 17 have been fitted to be pressed resiliently towards each other by means of a spring member 23 fitted around the filling tube 28, the spring member 23 forcing a slide ring 22 situated around the same feeding member 28 downwards towards the levers 17. From the slide ring 22 there protrude two arms 24, the lower ends of which press against the perpendicularly outwards oriented second lever arms 19 of the levers 17.

In a preferred embodiment of the invention the hook-like arms 18 are in the open position when the shuttle 1 arrives at the filling or emptying station, and close immediately when the shuttle 1 stops. The closing and opening of the hook-like levers 18 is achieved by means of a specific actuator (not shown), which acts on the second lever arm 19 of the levers 17 in order to force it against the action of the spring member 23 an the slide ring 22 with its arms 24, i.e. upwards in the case depicted in FIGS. 2a and 2b.

Alternatively, although not as advantageously, the force of the spring member 23 can be adjusted to a sufficient level to hold the shuttle 1 in place when the shuttle 1 is full, but preferably weak enough for the shuttle 1 to detach from the grip of the hook-like arms 18 when suction is created in the tube 2 to detach the shuttle 1 and to transfer it to the emptying station 4. Furthermore, it is evident that the filling tube 28 can be a vertically moving tube which, after the attachment of the shuttle 1, can be pushed vertically downwards into the shuttle 1 in order to open the closing flap 9 and to fill the shuttle, and can thereafter be withdrawn from the shuttle 1.

The emptying device depicted in FIGS. 3a and 3b is completely identical with the filling device depicted in FIGS. 2a and 2b, except that the emptying device has been inverted and in it the filling tube 28 has been replaced by a vertically moving spindle 29, which has a diameter substantially less than the diameter of the lower opening of the shuttle 1, so that the substance in the shuttle 1 can flow through the annular opening left between the spindle 29 and the shuttle 1 opening 8 into an outlet tube 30 below the gasketing stop 27, 31, the spindle 29 being fitted inside the outlet pipe 30. The upper end of the spindle 29 has a convex knob 32 which fits snugly in the shuttle 1 opening 8 and guides the spindle 29 into the opening 8 of the shuttle and facilitates the opening of the flap 9.

The emptying device 4 can, furthermore, be provided with a vibrator device (not shown), which ensures that the shuttle is completely empitied when the flap 9 is open.

What is claimed is:
1. A shuttle system comprising:
elongate, sleeve-shaped mantle means having a hollow interior and first and second openings communicating with said interior at first and second opposing ends, respectively, of said mantle means;

a first closing member mounted on said mantle means to open toward said interior and being resiliently biased to close said first opening;

a second closing member mounted on said mantle means to open toward said interior and being resiliently biased to close said second opening;

stationary filling means having first grip means for holding said mantle means, said first grip means including a first pair of arm levers pivotally attached to said filling means, each of said arm levers having a hook-shaped arm positioned to engage said first end, and a second arm;

first means mounted on said filling means for sliding toward and away from said second arms of said first pair of arm levers;

first resilient means for urging said sliding means toward said second arms of said first pair of arm levers to engage said second arms thereof and pivot said hook-shaped arms thereof toward each other; and first means for opening said first closing member and depositing material in said interior.

2. The shuttle of claim 1 wherein said first and second openings are smaller in cross sectional area than said mantle means.

3. The shuttle system of claims 1 or 2 wherein at least one of said first and second closing members comprises flap means pivotably attached to said mantle means within said interior such that said flap means may be pivotally away from an adjacent one of said openings to be substantially perpendicular thereto.

4. The shuttle system of claim 1 wherein at least one of said ends includes a conically converging section, and an associated one of said closing members presses against an inner surface thereof.

5. The shuttle system of claim 1 wherein said mantle means includes gasket means adjacent to said ends.

6. The shuttle system of claim 1 wherein at least one of said ends includes a tubular neck section having an annular protruding collar.

7. The shuttle system of claim 1 wherein said first grip means includes filling stop means positioned to engage said first end of said mantle means when in filling configuration; and said first opening means includes a filling tube sized to extend through said first opening and into said interior sufficiently to deflect said first closing member to an open position when said mantle means is in said filling configuration.

8. The shuttle system of claim 6 further comprising stationary emptying means having second grip means for holding said mantle means; and second means for opening said second closing member and permitting material to be evacuated from said interior through said second opening.

9. The shuttle system of claim 8 wherein said second opening means includes emptying stop means positioned to engage said second end of said mantle means when in an emptying configuration; and said second opening means includes an emptying tube and spindle means substantially concentric with said emptying tube and displaceable through said second opening into said interior sufficiently to deflect said second closing member to an open position, when said mantle means is in said emptying configuration, said spindle means being shaped to allow material in said interior to flow therefrom through said second opening to said emptying tube.

10. The shuttle system of claim 1 wherein said second grip means includes a second pair of arm levers pivotally attached to said emptying means, each of said arm levers having a hook-shaped arm positioned to engage said second end, and a second arm; second means mounted on said emtpying means for sliding toward and away from said second arm of said second pair of levers; and second resilient means for urging said second sliding means toward said second arms of said second pair of arm levers to engage said second arms thereof and pivot said hook-shaped arms thereof toward each other.

11. The shuttle system of claim 10 wherein said hook-shaped arms of said first and second grip means include inwardly-facing beveled ends positioned to engage and be deflected sidewardly by an associated one of said ends of said mantle means.

12. The shuttle system of claim 11 wherein said hook-shaped arms of said first and second grip means each include outwardly-facing beveled ends, and said ends of said mantle means each include inwardly-facing beveled surfaces positioned to be engaged by said outwardly-facing beveled ends, whereby one of said ends of said mantle means engaged by one of said pairs of hook-shaped arms is urged against an associated one of said stop means.

13. The shuttle system of claim 12 further comprising tube means extending between and forming a closed chamber with said filling and emptying means, said mantle means being slidably mounted within said tube means.

14. A shuttle system comprising:

elongate, sleeve-shaped mantle means having a hollow interior and first and second openings communicating with said interior at first and second opposing ends, respectively, of said mantle means;

a first closing member mounted on said mantle means to open toward said interior and being resiliently biased to close said first opening;

a second closing member mounted on said mantle means to open toward said interior and being resiliently biased to close said second opening;

stationary emptying means having second grip means for holding said mantle means; and second means for opening said second closing member and permitting material to be evacuated from said interior through said second opening, said second opening means including emptying stop means positioned to engage said second end of said mantle means when in an emptying configuration, and a stationary emptying tube and spindle means subtantially concentric with said emptying tube and displaceable relative to said tube through said second opening into said interior sufficiently to deflect said second closing member to an open position when said mantle means is in said emptying configuration, said spindle means being shaped to allow material in said interior to flow therefrom, around said spindle means, and through said second opening to said emtpying tube.

* * * * *